Figure 1:
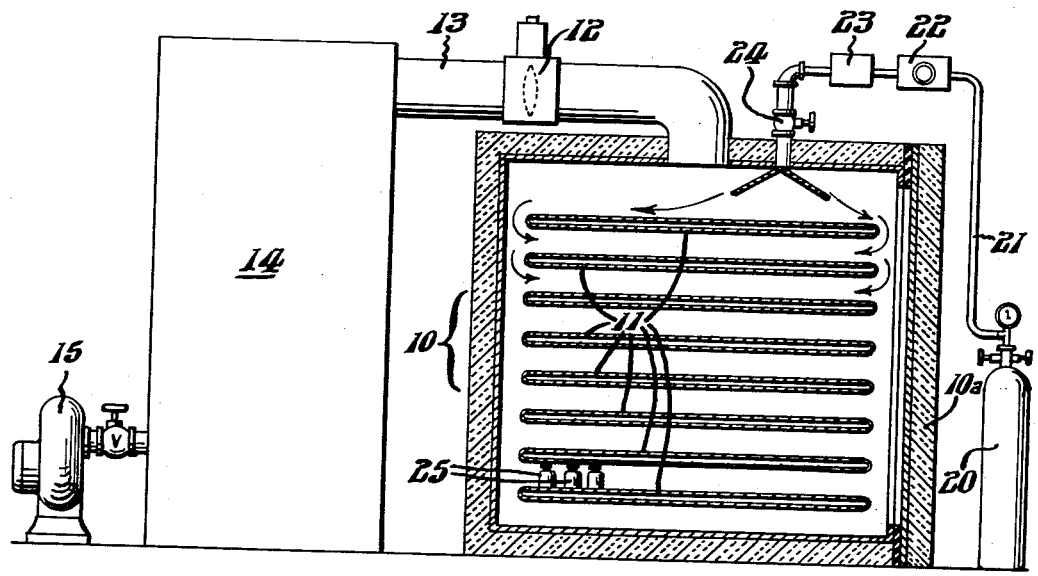

Aug. 4, 1964

M. G. COADY 3,143,471
ARGON METHOD OF DRYING AND PRESERVING LYOPHILIZED
THERAPEUTIC PRODUCTS
Filed Jan. 18, 1962

INVENTOR.
Michael G. Coady,
BY
Paul & Paul
ATTORNEYS.

ically inactive and it is an excellent preservative for
United States Patent Office 3,143,471
Patented Aug. 4, 1964

3,143,471
ARGON METHOD OF DRYING AND PRESERVING LYOPHILIZED THERAPEUTIC PRODUCTS
Michael G. Coady, Broomall, Pa., assignor to Merck & Co., Inc., Rahway, N.J., a corporation of New Jersey
Filed Jan. 18, 1962, Ser. No. 167,192
3 Claims. (Cl. 167—78)

This invention relates to a method of drying and preserving vaccines and similar products during and after lyophilization, and to a container for the dry lyophilized product.

Many products such as vaccines and other biological products and pharmaceuticals which are produced in dry powder form by lyophilization are required to meet specifications regarding minimum moisture content. In many such products and in particular virus and other vaccines the moisture content must be less than 1% by weight since excess water in the product causes rapid deterioration. Accordingly, not only the drying process but the preserving process as well must be carried out in such a way that the minimum moisture requirement is observed. This has been difficult to accomplish. Heretofore, dry nitrogen has been used but it has given considerable trouble in actual practice since the 1% moisture figure has been extremely difficult to meet, even where the best quality and dryest available dry nitrogen has been utilized. Because of limitations that are present in the fractionation processes that are now available for producing dry nitrogen, the product is not sufficiently dry with a sufficient degree of uniformity to meet the requirements set forth above. This is particularly noticeable where the lyophilization process is applied to vaccines and other products that are contained in a vial or other container which has a large volume containing gas and only a very small volume containing the solid product.

Another problem in the drying and preserving of lyophilized vaccines and the like is that the gases present often tend to combine with the solid material that is present in the vial. Accordingly, it is frequently impossible or at least highly inadvisable to utilize gases such as carbon dioxide for example which combine with the substances present in many products and in particular vaccines.

Accordingly, it is an object of this invention to provide a method of drying and preserving lyophilized products, which method produces a product having less than 1% by weight of moisture and which is sufficiently stable that it may be stored for a reasonable period of time prior to its administration to the patient.

Figure 2:
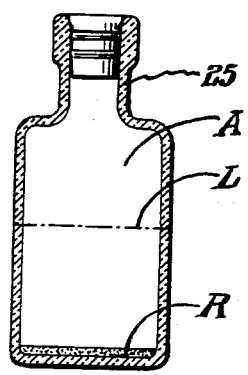

Other objects and advantages of this invention will further become apparent hereinafter and in the drawings of which:

FIG. 1 is a diagrammatic view in side elevation showing an apparatus in which the method according to this invention may be carried into effect; and FIG. 2 is a view in side elevation showing a vial containing a solid lyophilized material produced in accordance with the method of this invention.

It has been discovered in accordance with this invention that the vacuum drying process may be carried into effect by introducing into the lyophilization chamber and even into the vials themselves which contain the vaccine, substantially pure elemental argon. Preferably, the argon contains a maximum of impurities as follows:

|  | Percent by volume |
|---|---|
| Oxygen | .0005 |
| Hydrogen | .0005 |
| Nitrogen | .003 |
| Water | .00084 |

Argon is produced by liquefaction, distillation and rectification of air and its boiling point is between the boiling points of oxygen and hydrogen. In preparing pure argon, the oxygen is removed chemically and the gas is reliquefied to boil off the nitrogen. Argon is chemlyophilized vaccines and the like.

Notwithstanding the extremely low moisture content of argon after the completion of the reliquefication step referred to above, the argon is preferably passed over alumina at high pressure thereby removing further moisture, producing a product having a dew point which is less than about −76° F. This produces a moisture content which is less than about 0.02 milligram per liter and is less than 0.00084% by weight.

Referring to FIG. 1 of the drawings, the number 10 designates the lyophilization cabinet having a multiplicity of shelves 11 each of which is hollow and contains refrigerant, which refrigerant flows at a predetermined rate through all of the shelves 11, maintaining them at the desired cold temperature. The number 12 designates a vacuum valve connected in the vacuum line 13, which is connected through a condenser 14 to a high vacuum pump 15. The number 20 designates a cylinder of argon connected through a line 21 and through a desiccant filter 22. The filter 22 contains an indicator which changes color in the presence of more than a predetermined minimum amount of moisture. The number 23 designates a sterile air filter through which the dry argon flows, and the argon is introduced into the cabinet 10 by means of an inlet valve 24.

It will be noted that a few vials 25 appear in the drawing, mounted on the refrigerated shelves 11. In actual practice, the entire lyophilization cabinet 10 is filled substantially completely with vials containing lyophilized vaccine or the like, representing a very large concentration of expensive pharmaceutical material. Accordingly, it is extremely important that this valuable material be lyophilized with utmost reliability since any inadvertent introduction of moisture causes premature deterioration of the product, reqiuring that the entire batch be discarded.

In operation, in accordance with the process of this invention, the lyophilization cabinet 10 is evacuated in the normal course of the prior cycle of operation and, after completing the evacuation, it is filled with dry argon. The argon is transferred into the cabinet 10 at the completion of the lyophilization process, by closing vacuum valve 12 between the lyophilization cabinet 10 and the condenser 14, thus preventing further evacuation of the cabinet. Because the cabinet 10 is air-tight, it is maintained at a high vacuum (approximately 50–100 microns of mercury absolute pressure) until gas is permitted to flow into it. This is accomplished by opening the valve and regulator on the argon cylinder 20 and the inlet valve 24, allowing argon to flow through the flow line 21, desiccant 22 and sterile air filter 23. The flow of argon is suitably baffled by the baffle means shown in the drawing, and the argon stream is caused to pass in close contact with the surfaces of the refrigerated shelves 11, thus cooling the argon gas rapidly. After the chamber has been filled with cold argon gas in this manner, the pressure is increased above atmospheric pressure to about two pounds per square inch gauge, after which the door 10a is opened. The vials containing frozen pharmaceutical preparations such as vaccines and the like are then quickly charged into the lyophilization cabinet. It is important that this step of the operation be performed quickly because permanent damage may be done to the contents of the vials if they are permitted to thaw. When the charging of the chamber is complete, the precooled argon contacts the vials preventing their contents from thawing out, and the door 10a is then closed and the vacuum in the cabinet 10 is re-established by means of the usual roughing pumps (not shown), after which the vacuum line is switched over to the line 13, condenser 14 and high vacuum pump 15. This pulls the vacuum down to approximately 50 microns of mercury absolute, and the temperature within lyophilization cabinet 10 is adjusted by adjusting the temperature of the refrigerant flowing in the shelves 11, in order to bring about the sublimation of water, over an extended period of time, thus producing the dry powdered products in the vials contained in the cabinet 10. At the conclusion of the lyophilization cycle, as heretofore explained in detail, the chamber is again filled with dry argon.

It is important in accordance with this invention that oxygen is excluded. When vials are removed from the chamber, they are filled with argon which is heavier than air. Thus the bottles can be moved even though they may be open at the top, and the dry powdered product is protected from the reactive effect of oxygen or moisture. As shown in FIG. 2, the vial is closed against the atmosphere by means of a cap and the dry product is maintained in a dry argon atmosphere until the time of its use. The slight excess of pressure at the time that the cabinet door 10a is opened insures that the containers are blanketed wtih argon when removed.

The vial shown in FIG. 2 contains an atmosphere of substantially pure argon A over a small quantity of the lyophilized solid residue R. The line L designates the original liquid level of the liquid product prior to lyophilization, illustrating the very substantial volume of water removed during the lyophilization process, and further illustrating the relatively great volume of gas above the residue R. Because of the large amount of gas present, it must have a very low moisture content and must be completely inert to avoid accelerated product decomposition.

Although this invention has been described with reference to specific forms thereof, it will be appreciated that although the gaseous element is limited to argon, various features of the invention as described herein may be used independently of other features without departing from the spirit and scope of the invention, which is defined in the appended claims.

Having thus described my invention, I claim:
1. In a method of preserving and stabilizing a lyophilized therapeutic preparation, the steps which comprise:
 (1) filling a confined space with dry argon,
 (2) introducing into said confined space a container having therein a moist therapeutic preparation, said container having a filler opening spaced from the bottom thereof,
 (3) evacuating the argon from said confined space while maintaining a temperature sufficient to bring about the sublimation of moisture from said preparation until said moisture has been substantially completely removed,
 (4) reintroducing dry argon into said confined space and into said container,
 (5) increasing the pressure of the argon in said confined space in excess of atmospheric pressure,
 (6) removing said container from said confined space and exposing it to the atmosphere, and
 (7) then sealing said container in said atmosphere.

2. In a method of preserving and stabilizing a lyophilized therapeutic preparation, the steps which comprise:
 (1) filling a confined space with dry argon, said argon having a maximum percentage by volume of about .0005% oxygen, .0005% hydrogen and .003% nitrogen and about .00084% by weight of water,
 (2) introducing into said confined spaced a container having therein a moist therapeutic preparation,
 (3) evacuating the argon from said confined space while maintaining a temperature sufficient to bring about the sublimation of moisture from said preparation until said moisture has been substantially completely removed,
 (4) reintroducing dry argon into said confined space and into said container,
 (5) increasing the pressure of the argon in said confined space in excess of atmospheric pressure,
 (6) removing said container from said confined space and exposing it to the atmosphere, and
 (7) then sealing said container in said atmosphere.

3. In a method of preserving and stabilizing a lyophilized therapeutic preparation, the steps which comprise:
 (1) passing substantially dry argon over alumina, thereby producing a treated argon having a moisture content which is less than about .00084% by weight,
 (2) filling a confined space with said treated argon,
 (3) introducing into said confined space a container having therein a moist therapeutic preparation, said container having a filler opening spaced from the bottom thereof,
 (4) evacuating the treated argon from said confined space while maintaining a temperature sufficient to bring about the sublimation of moisture from said preparation until said moisture has been substantially completely removed,
 (5) reintroducing said treated argon into said confined space and into said container,
 (6) increasing the pressure of the argon in said confined space in excess of atmospheric pressure,
 (7) removing said container from said confined space and exposing it to the atmosphere, and
 (8) then sealing said container in said atmosphere.

References Cited in the file of this patent

UNITED STATES PATENTS

| | | |
|---|---|---|
| 1,858,610 | Banning | May 17, 1932 |
| 3,023,841 | Milton et al. | Mar. 6, 1962 |

FOREIGN PATENTS

| | | |
|---|---|---|
| 826,477 | Great Britain | Jan. 6, 1960 |

OTHER REFERENCES

Molland: Biol, Abstract, 1946, pages 1409, paragraph 12925.

Proom: J. Gen. Microbiol., 1949, pages 7, 8, 11, 16, 17 and 18.

Rooyen: J. Lab. and Clin. Med., March 1954, pages 489–494.

Mainster: Applied Microbiology, November 1958, pages 413–419.